(12) United States Patent
Lee et al.

(10) Patent No.: US 10,615,421 B2
(45) Date of Patent: Apr. 7, 2020

(54) MANUFACTURING METHOD OF NITROGENOUS CARBON ELECTRODE AND FLOW CELL PROVIDED THEREWITH

(71) Applicant: TAIWAN CARBON NANO TECHNOLOGY CORPORATION, Miaoli County (TW)

(72) Inventors: Kuang-Che Lee, Miaoli County (TW); Chien-Yao Huang, Miaoli County (TW); Jr-Wei Peng, Miaoli County (TW); Chun-Hsien Tsai, Miaoli County (TW); Chun-Jung Tsai, Miaoli County (TW); Ting-Chuan Lee, Miaoli County (TW)

(73) Assignee: TAIWAN CARBON NANO TECHNOLOGY CORPORATION, Miaoli County (TW)

( * ) Notice: Subject to any disclaimer, the term of this patent is extended or adjusted under 35 U.S.C. 154(b) by 433 days.

(21) Appl. No.: 15/416,467

(22) Filed: Jan. 26, 2017

(65) Prior Publication Data
US 2017/0222230 A1    Aug. 3, 2017

(30) Foreign Application Priority Data
Feb. 1, 2016   (TW) .............................. 105103166 A

(51) Int. Cl.
*H01M 4/96* (2006.01)
*H01M 4/88* (2006.01)
(Continued)

(52) U.S. Cl.
CPC ....... *H01M 4/8875* (2013.01); *H01M 4/8668* (2013.01); *H01M 4/8885* (2013.01);
(Continued)

(58) Field of Classification Search
None
See application file for complete search history.

(56) References Cited

U.S. PATENT DOCUMENTS

| | | | | |
|---|---|---|---|---|
| 3,755,193 A | * | 8/1973 | Luft | H01M 4/96 502/101 |
| 4,992,404 A | * | 2/1991 | Gruhl | B01D 53/8628 502/182 |

(Continued)

*Primary Examiner* — Tracy M Dove
(74) *Attorney, Agent, or Firm* — Muncy, Geissler, Olds & Lowe, PC

(57) ABSTRACT

A manufacturing method of nitrogenous carbon electrode and flow cell provided therewith is disclosed. Firstly, a preformed body is performed by mixing a carbon material, a polymeric material and a modifier. A formation process is performed on the preformed body to obtain a formed body. A high sintering is then performed, such that a part of the polymeric material is decomposed and then removed, while the other part of polymeric material is cooperated with the carbon material to form a skeletal structure including a plurality of pores, and that the nitrogen in the modifier is adhered to the skeletal structure to form a nitrogenous functional group, and then form a nitrogenous carbon electrode. The nitrogenous carbon electrode may be applied to the flow cell. Thereby, electric conductivity in a vertical direction may be enhanced, so as to reduce internal resistance of the flow cell and increase discharge power.

10 Claims, 4 Drawing Sheets

(51) Int. Cl.
    *H01M 4/86*    (2006.01)
    *H01M 8/18*    (2006.01)
(52) U.S. Cl.
    CPC ............... *H01M 4/96* (2013.01); *H01M 8/18* (2013.01); *H01M 8/188* (2013.01); *Y02E 60/528* (2013.01); *Y02P 70/56* (2015.11)

(56) References Cited

U.S. PATENT DOCUMENTS

| | | | | |
|---|---|---|---|---|
| 5,240,893 | A * | 8/1993 | Witherspoon | B01J 37/084 |
| | | | | 204/294 |
| 8,900,755 | B2 * | 12/2014 | Liu | H01G 11/06 |
| | | | | 429/231.7 |
| 2009/0258298 | A1 * | 10/2009 | Umeno | C04B 35/62839 |
| | | | | 429/231.8 |
| 2012/0045680 | A1 | 2/2012 | Dong et al. | |
| 2012/0241691 | A1 * | 9/2012 | Soneda | C01B 21/0605 |
| | | | | 252/511 |
| 2014/0134521 | A1 * | 5/2014 | Naito | H01M 4/0404 |
| | | | | 429/523 |
| 2016/0167968 | A1 * | 6/2016 | Tohji | H01M 4/96 |
| | | | | 564/1 |

* cited by examiner

MANUFACTURING METHOD OF NITROGENOUS CARBON ELECTRODE AND FLOW CELL PROVIDED THEREWITH

FIELD OF THE INVENTION

The present invention is related to a manufacturing method of carbon electrode, particularly to a manufacturing method of nitrogenous carbon electrode and flow cell provided therewith.

BACKGROUND OF THE INVENTION

An electrochemical flow cell, also called a redox flow battery, is an electrochemical energy storage device, which is primarily classified into full vanadium flow and cell zinc-bromine, as well as is one kind of high-performance storage battery provided with separated positive and negative electrode electrolytes circulated individually, featuring high capacity, wide application field, long service life, flexible element design and etc.

As disclosed in U.S. published patent application no. 20120045680, entitled "Redox flow battery", there is disclosed a redox flow battery comprising a battery tank, a membrane within the battery tank, and a positive electrode and a negative electrode respectively provided on two sides of the membrane. A positive electrode electrolyte and a negative electrode electrolyte are supplied to the battery tank. In this case, the positive electrode electrolyte contains a manganese ion. The negative electrode electrolyte contains at least one type of metal ion selected from a titanium ion, a vanadium ion, a chromium ion, a zinc ion, and a tin ion. The means of suppressing generation of a precipitation of $MnO_2$ is obtained by further containing a titanium ion in the positive electrode electrolyte.

Generally speaking, the electrode is formed of modified carbon felt. In the carbon felt, however, high electric conductivity is provided in a horizontal direction, while low electric conductivity and small specific surface area, resulting in poor capacity of redox and thus reduced discharge power are provided in a vertical direction. Therefore, how to increase electric conductivity and specific surface area of the electrode in the vertical direction is truly a significant topic.

SUMMARY OF THE INVENTION

It is the main object of the present invention to solve the problem of poor electric conductivity and small specific surface area, resulting in poor capability of redox and thus reduced discharge power of the electrode in the vertical direction.

For achieving the above object, the present invention provides a manufacturing method of nitrogenous carbon electrode, comprising the steps of:

forming a preformed body by mixing a carbon material having weight percentage between 30% and 85%, a polymeric material having weight percentage between 15% and 60%, and a modifier having weight percentage between 3% and 25%, in which the modifier includes nitrogen, and the modifier is selected from the group consisting of amine, amide, nitrogenous heterocyclic organic compound and ammonium salt;

performing a formation process on the preformed body so as to obtain a formed body; and performing a high sintering on the formed body, such that a part of the polymeric material is decomposed and then removed, while the other part of polymeric material is cooperated with the carbon material to form a skeletal structure including a plurality of pores, and that the nitrogen in the modifier is adhered to the skeletal structure to form a nitrogenous functional group, and then form a nitrogenous carbon electrode.

For achieving the above object, the present invention further provides a flow cell, comprising an isolation membrane; a first battery tank provided on one side of the isolation membrane; a second battery tank provided on the other side, far away from the first battery tank, of the isolation membrane; two carbon electrodes provided on two opposite sides of the isolation membrane, the carbon electrodes being manufactured by the above method, the carbon electrodes comprising a first carbon electrode provided in the first battery tank and a second carbon electrode provided in the second battery tank; a first collector plate contacted with the first carbon electrode; a second collector plate contacted with the second carbon electrode; a conductive part electrically connected to the first collector plate and the second collector plate; a first electrolyte storage communicated with the first battery tank and allowed to convey a first electrolyte to the first battery tank; and a second electrolyte storage communicated with the second battery tank and allowed to convey a second electrolyte to the second battery tank.

To sum up, the present invention is provided with features as follows:

1. The high sintering is performed on the formed body, such that a part of the polymeric material is decomposed and then removed, while the other part of polymeric material is cooperated with the carbon material to form the skeletal structure and the pores. Thus, the specific surface area of the nitrogenous carbon electrode is increased, such that the first electrolyte and the second electrolyte may be subject to sufficient redox reactions therein, so as to enhance discharge power.

2. The nitrogenous carbon electrode is provided with a nitrogenous functional group by means of the addition of the modifier, such that good electric conductivity is also provided in the vertical direction, so as to reduce internal resistance and enhance discharge power. Further, features of the enhancement of hydrophilicity of the nitrogenous carbon electrode, enhanced response characteristics of vanadium ion, modified porous characteristics and etc., are advantageous in application.

3. The polymeric material is used as structural body for supporting the carbon material temporarily by means of the formation process. Subsequently, the high sintering is performed to remove the polymeric material so as to form individual nitrogenous carbon electrode applied to various uses without the need for combining with other materials.

4. The electrode of the present invention is rigid and in the form of bulk material, while the electrode of the prior art is presented in the form of flake and stacked structure. Therefore, as long as the thickness of the carbon electrode is increased, an electrode of the same size as before can be obtained. Thus, the usage area of the first collector plate and the second collector plate is reduced, so as to further reduce the use of material. Therefore, the use and cost of the metal collector plate may be reduced significantly.

DETAILED DESCRIPTION OF THE PREFERRED EMBODIMENTS

The detailed description and technical content of the present invention will now be described in combination with drawings as follows.

Figure 1:
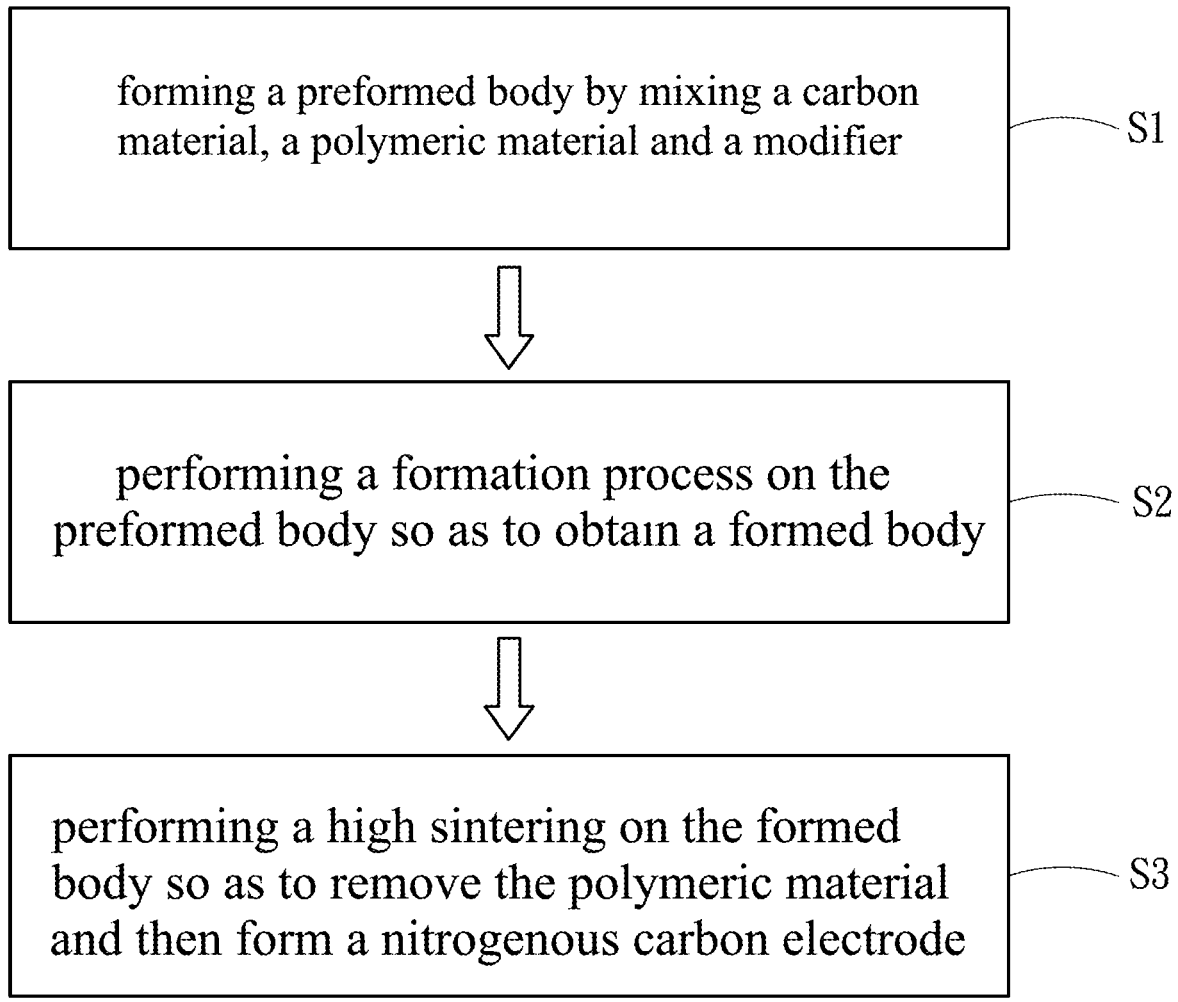
FIG. 1 is a manufacturing flow chart of a nitrogenous carbon electrode of the present invention.

Referring to FIG. 1, there is shown a manufacturing flow chart of a preferred embodiment of the present invention, providing a manufacturing method of nitrogenous carbon electrode, comprising the steps as follows.

In step S1, a preformed body is formed by mixing a carbon material having weight percentage between 30% and 85%, a polymeric material having weight percentage between 15% and 60%, and a modifier having weight percentage between 3% and 25%, the modifier including nitrogen, in which the carbon material may be carbon nanotube, graphene, carbon black, carbon fiber, active carbon, graphite, hollow carbon, soft carbon, hard carbon or the combination thereof while the polymeric material may be polyvinyl chloride (abbreviated as PVC), polytetrafluoroethene (abbreviated as PTFE), furan resin, epoxy, phenol formaldehyde resin, polyacrylonitrile (abbreviated as PAN), polyvinyl alcohol (abbreviated as PVA), cellulose, polyvinylidene fluoride (abbreviated as PVDF), fluorinated ethylene propylene (abbreviated as FEP) or the combination thereof and the modifier may be amine, amide, nitrogenous heterocyclic organic compound, ammonium salt, or the combination thereof.

In this embodiment, the general formula of amine is $R1-NH_2$ or $NH_2-R1-NH_2$, in which R1 may be $C_3$-$C_{24}$ alkyl group, such as propylamine, isopropylamine, hexylamine, octylamine, dihexylamine, 3-methyl-2-diaminopentane, ethylene diamine and etc., and R1 may be also aryl group, such as aniline, toluidine, naphthylamine, benzidine, biphenyldiamine, phenylenediamine, toluylenediamine, phenylenediamine, 2,6-toluylenediamine and etc. The general formula of amide is $R2-CONH_2$, in which R2 may be $C_1$-$C_{18}$ alkyl group, crude oil naphthene base and etc., and may be also aromatic group, such as phenyl, naphthyl and so on, while R2 may be still amino. Amide may be acetamide, urea, acetylaniline and etc.; nitrogenous heterocyclic organic compound may be pentatomic heterocyclics, such as pyrrolidine, pyrrole and etc., or hexahydric heterocyclics, such as pyridine, piperidine, 4-amino-2-oxypyrimidine, 2,4-dioxypyrimidine, melamine, 5-methyl-2,4-dioxypyrimidine. The general formula of ammonium salt is $NH_4COO-R3$, in which R3 may be hydroxyl, such as ammonium bicarbonate, and may be also amino, such as ammonium carbamate, while R3 may be possibly substituted by hydrogen or methyl directly, such as ammonium formate, ammonium acetate, and R3 may be also ammonio, such as ammonium carbonate.

In step S2, a formation process is performed on the preformed body so as to obtain a formed body. The preformed body is situated at a heated temperature between 100° C. and 220° C., while under a forming pressure between the 5 kg/cm$^2$ and 200 kg/cm$^2$ in the formation process. The formed body is formed by modifying consistency and stereo structure of the preformed body under the heated temperature and the forming pressure. Moreover, the volume of the formed body is smaller than that of traditional carbon felt. In this embodiment, the formation process is possibly a hot pressing procedure, i.e., applying heated temperature and the forming pressure simultaneously, and possibly applying the heated temperature firstly followed by applying the forming pressure, but not limited thereto.

In step S3, a high sintering is performed on the formed body to form a nitrogenous carbon electrode. The formed body is situated at a heated temperature between 400° C. and 1200° C., while in an inert atmosphere, allowing for the polymeric material to be cracked by combustion in the formed body, such that a part of the polymeric material is decomposed and then removed, while the other part of polymeric material is served as a binder and cooperated with the carbon material to form a three-dimensional stereo reticulate skeletal structure including a plurality of pores, in such a way that weight percentage of carbon material is higher than that of just added carbon material, i.e., the most part of the nitrogenous carbon electrode is composed of the carbon material, while the nitrogen in the modifier is adhered to the skeletal structure to form a nitrogenous functional group, and then form the nitrogenous carbon electrode.

In this embodiment, a porosity of the pores is in a range of 10% to 85%, such that the specific surface area and inner space of the nitrogenous carbon electrode are enhanced significantly, and further electric conductivity and discharge power are enhanced. At the same time, nitrogen contained in the modifier is utilized such that the nitrogenous functional group is formed from the formed body in the process of high sintering. Thereby, enhanced hydrophilicity, enhanced response characteristics of vanadium ion and modified porous characteristics may be obtained. In the present invention, the inert atmosphere may be argon or nitrogen.

It is worthy to mention that additional carbon material adhered between the carbon materials may be further produced in the process of high sintering. This additional carbon material may be remained between the carbon materials after polymeric material or the modifier is cracked by combustion, or may be provided by additionally introduced carbonic atmosphere. Moreover, residual carbon is capable of enhancing electric conductivity of the carbon material.

Subsequently, referring to FIGS. 2 and 3 together, there is shown a flow cell using the nitrogenous carbon electrode. The flow cell may be full vanadium flow cell or cell zinc-bromine flow cell, but the present invention is not limited thereto. The flow cell includes an isolation membrane 10, a first battery tank 20, a second battery tank 30, a first carbon electrode 40, a second carbon electrode 50, a first electrolyte storage 60, a second electrolyte storage 70, a first collector plate 100 contacted with the first carbon electrode 40, a second collector plate 110 contacted with the second carbon electrode 50, a conductive part 80 electrically connected to the first collector plate 100 and the second collector plate 110, and a load 90 electrically connected to the conductive part 80. The first carbon electrode 40 and the second carbon electrode 50 are manufactured by the above method. The first battery tank 20 and the second battery tank 30 are provided on two sides of the isolation membrane 10, respectively. The first carbon electrode 40 is provided in the first battery tank 20, while the second carbon electrode 50 is provided in the second battery tank 30. The first electrolyte storage 60 and the first battery tank 20 are communicated with each other, while a first pump 61 is used to convey a first electrolyte to the first battery tank 20 from the first electrolyte storage 60, such that the first carbon electrode 40 and the first collector plate 100 are contacted with the first electrolyte. The second electrolyte storage 70 and the second battery tank 30 are communicated with each other, while a second pump 71 is used to convey a second electrolyte to the second battery tank 30 from the second electrolyte storage 70, such that the second carbon electrode 50 and the second collector plate 110 are contacted with the second electrolyte. Then, electricity is generated by ion exchange via the isolation membrane 10.

Figure 2:
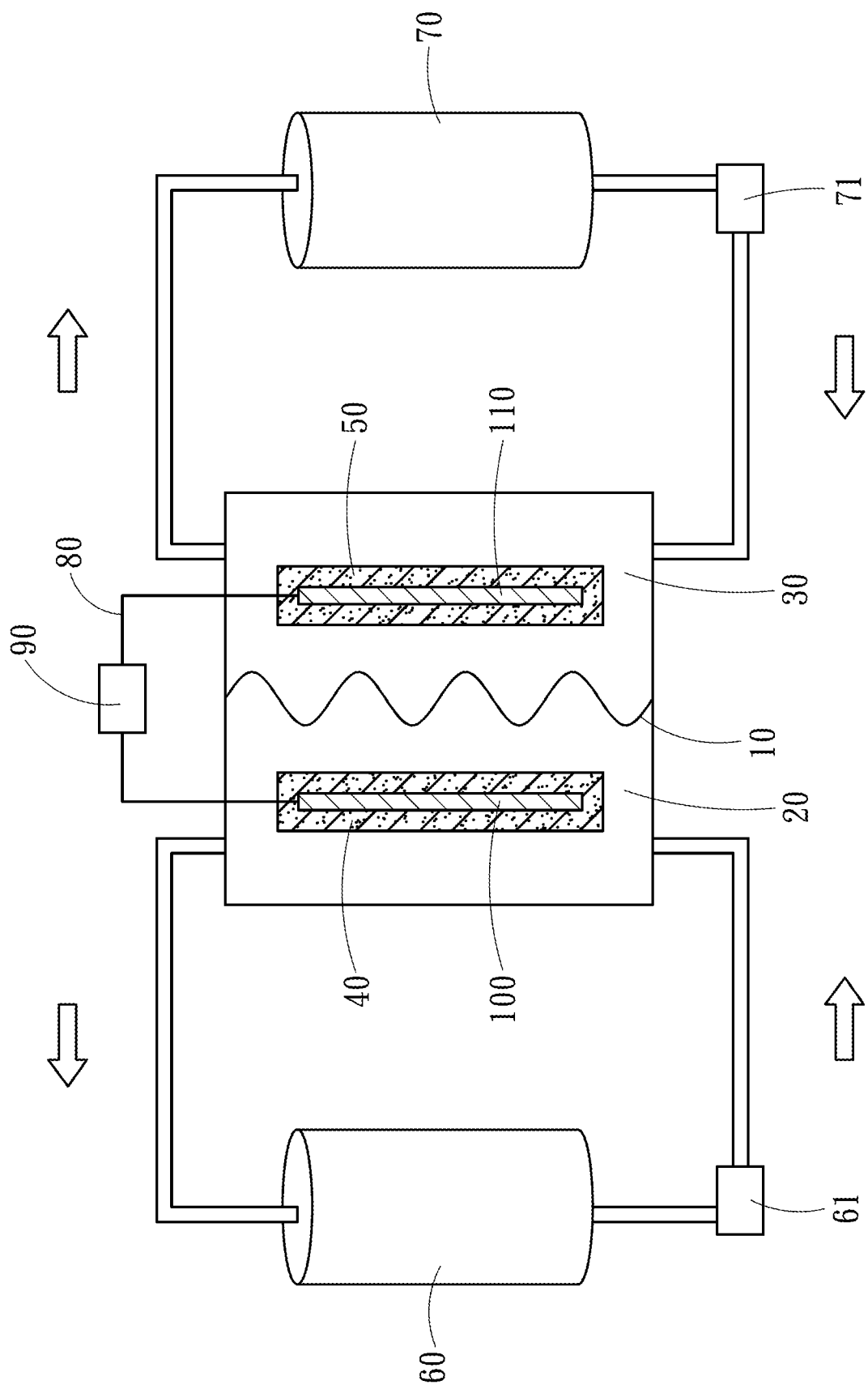
FIG. 2 is a partial cross-section diagram of the application of a flow cell of a first embodiment of the present invention.
Figure 3:
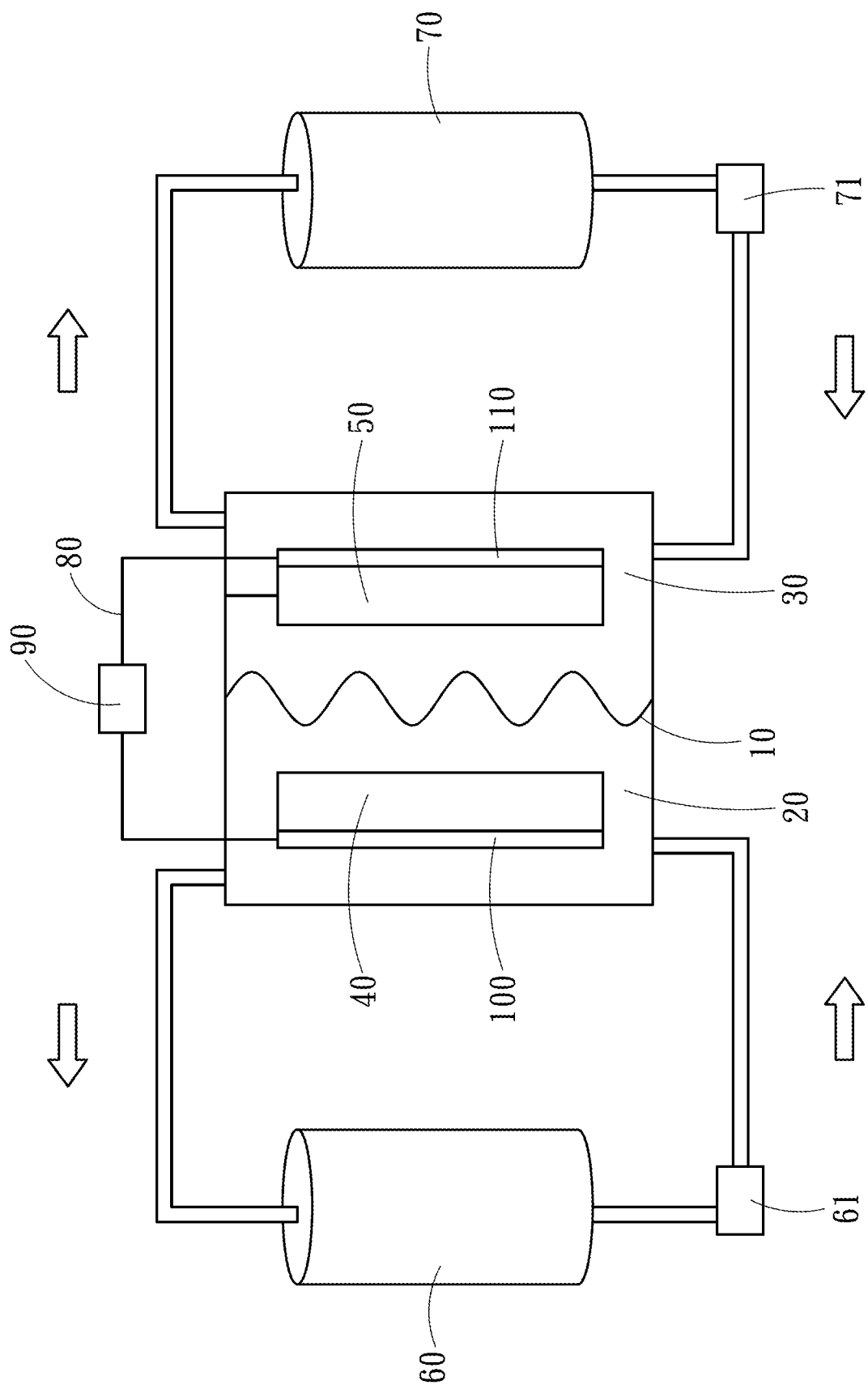
FIG. 3 is a diagram of the application of a flow cell of a second embodiment of the present invention.

As illustrated in FIG. 2, there is shown a first embodiment of the present invention, in which the first collector plate 100 and the second collector plate 110 are embedded into the first carbon electrode 40 and the second carbon electrode 50, respectively. Further, a second embodiment is shown in FIG. 3, in which the first collector plate 100 is provided at one side, far away from the isolation membrane 10, of the first carbon electrode 40, while the second collector plate 110 is provided at one side, far away from the isolation membrane 10, of the second carbon electrode 50, but not limited thereto. Also, each collector plate may be provided at one side next to the isolation membrane 10. In this case, the material of the isolation membrane 10 is selected from the group consisting of perfluorosulphonic acid membrane, partial fluoride membrane, non-perfluorinated ion exchange membrane, porous ion conductive membrane and etc. The partial fluoride membrane may be ethylene-tetrafluoroethylene, ETFE, polyvinylidene fluoride and so on. The non-perfluorinated ion exchange membrane may be hydrocarbon ion resin. The porous ion conductive membrane may be polyethylene, polypropylene and so on. Further, the material of the first collector plate 100 and the second collector plate 110 may be metal, such as copper, aluminum and so on.

The nitrogenous carbon electrode is provided with the pores, such that the first electrolyte and the second electrolyte are subject to redox reactions in the pores. Moreover, the nitrogenous carbon electrode is composed of various kinds of carbons without any insulating binder, such that good electric conductivity is also provided in the vertical direction, so as to reduce internal resistance of the flow cell and further increase discharge power. Moreover, in comparison with flake-like electrode in stacked structure in the prior art, the usage area of the first collector plate 100 and the second collector plate 110 of this novel type may be smaller under the condition of the electrodes of the same volume. Thus, the use of material may be reduced, so as to further reduce the manufacturing cost.

Figure 4:
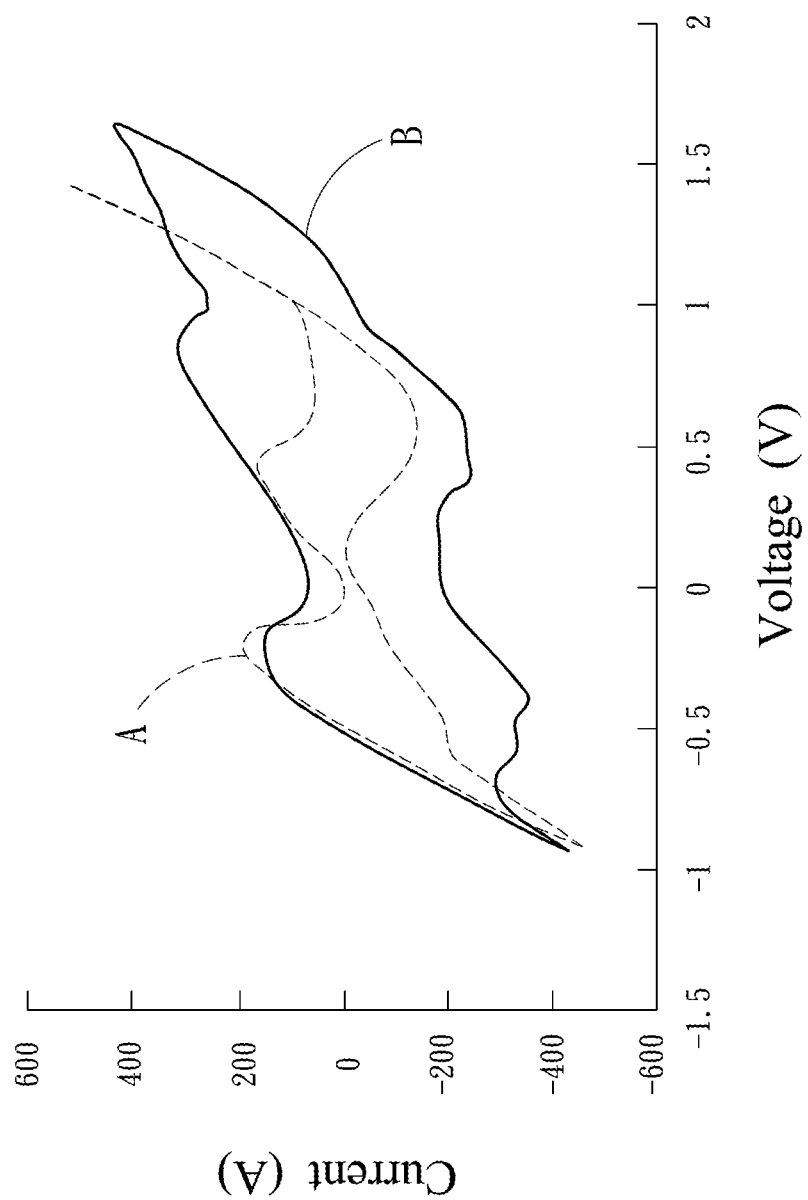
FIG. 4 is a data graph of a preferred embodiment of the present invention.

Subsequently, referring to FIG. 4 together, there is shown a data graph made by cyclic voltammetry (CV), in which curve A is related to data of the flow cell made of the traditional carbon felt electrode, and curve B is related to data of the flow cell made by the nitrogenous carbon electrode of the present invention. It is known from the comparison that the current of the present invention is twice as large as that in the traditional carbon felt electrode. Therefore, the output power is also doubled.

To sum up, the present invention is provided with features as follows:

1. The consistency and stereo structure of the preformed body may be modified, and further the formed body is formed by means of the formation process, such that the volume of the formed body is smaller than that of traditional carbon felt electrode.

2. The polymeric material is removed by means of the high sintering, such that a part of the polymeric material is decomposed and then removed, while the other part of the polymeric material is cooperated with the carbon material to form the pores and the skeletal structure. Moreover, weight percentage of the carbon material is higher than that of just added carbon material. Furthermore, the specific surface area and the inner space of the nitrogenous carbon electrode are enlarged significantly due to these pores. Thus, electric conductivity and discharge power are further enhanced.

3. The additional carbon material is remained between the carbon materials by means of the high sintering, so as to enhance electric conductivity of the carbon material.

4. The individual nitrogenous carbon electrode of rigid structure is formed after the polymeric material is removed by means of the high-temperature processing, and may be applied to various uses without the need for combining with other materials.

5. The nitrogenous carbon electrode is provided with a nitrogenous functional group by means of the addition of the modifier, such that good electric conductivity is also provided in the vertical direction, so as to reduce internal resistance and enhance discharge power. Further, features of the enhancement of hydrophilicity of the nitrogenous carbon electrode, enhanced response characteristics of vanadium ion, modified porous characteristics and etc., are advantageous in application.

6. The first electrolyte and the second electrolyte may be subject to redox reactions in these pores, while good electric conductivity is also provided in the vertical direction, when the nitrogenous carbon electrode is applied to the flow cell. Thus, the internal resistance of the flow cell may be reduced, and discharge power is further reduced.

7. The usage area of the first collector plate and the second collector plate is reduced, so as to reduce the use of material, and further reduce cost of the manufacturing process.

What is claimed is:

1. A manufacturing method of a nitrogenous carbon electrode, comprising the steps of:
   forming a preformed body by mixing a carbon material having weight percentage between 30% and 85%, a polymeric material having weight percentage between 15% and 60%, and a modifier having weight percentage between 3% and 25%, wherein said modifier includes nitrogen, and said modifier is selected from the group consisting of amine, amide, nitrogenous heterocyclic organic compound and ammonium salt;
   performing a formation process on said preformed body so as to obtain a formed body; and
   performing a sintering process on said formed body for decomposing and removing a part of said polymeric material to form a skeletal structure with a plurality of pores, and then said nitrogen in said modifier is adhered to said skeletal structure to form said nitrogenous carbon electrode.

2. The manufacturing method of said nitrogenous carbon electrode according to claim 1, wherein said carbon material is selected from the group consisting of carbon nanotube, graphene, carbon black, carbon fiber, active carbon, graphite, hollow carbon, soft carbon and hard carbon.

3. The manufacturing method of said nitrogenous carbon electrode according to claim 1, wherein said polymeric material is selected from the group consisting of polyvinyl chloride, polytetrafluoroethene, furan resin, epoxy, phenol formaldehyde resin, polyacrylonitrile, polyvinyl alcohol, cellulose, polyvinylidene fluoride and fluorinated ethylene propylene.

4. The manufacturing method of said nitrogenous carbon electrode according to claim 1, wherein said amine is selected from the group consisting of propylamine, isopropylamine, hexylamine, octylamine, dihexylamine, 3-methyl-2-diaminopentane, ethylene diamine, aniline, toluidine, naphthylamine, benzidine, biphenyldiamine, phenylenediamine, toluylenediamine, phenylenediamine and 2,6-toluylenediamine.

5. The manufacturing method of said nitrogenous carbon electrode according to claim 1, wherein said amide is selected from the group consisting of acetamide, urea and acetylaniline.

6. The manufacturing method of said nitrogenous carbon electrode according to claim 1, wherein said nitrogenous heterocyclic organic compound is selected from the group consisting of pyrrolidine, pyrrole, pyridine, piperidine, 4-amino-2-oxypyrimidine, 2,4-dioxypyrimidine, melamine and 5-methyl-2,4-dioxypyrimidine.

7. The manufacturing method of said nitrogenous carbon electrode according to claim 1, wherein said ammonium salt is selected from the group consisting of ammonium carbamate, ammonium formate, ammonium acetate and ammonium carbonate.

8. The manufacturing method of said nitrogenous carbon electrode according to claim 1, wherein said preformed body is heated at a temperature between 100° C. and 220° C., while under a forming pressure between 5 kgf/cm2 and 200 kgf/cm2 in said formation process.

9. The manufacturing method of said nitrogenous carbon electrode according to claim 1, wherein said formed body is heated at a temperature between 400° C. and 1200° C. in said sintering process.

10. The manufacturing method of said nitrogenous carbon electrode according to claim 1, wherein said nitrogenous carbon electrode is provided with a porosity in a range between 10% to 85%.

\* \* \* \* \*